UNITED STATES PATENT OFFICE.

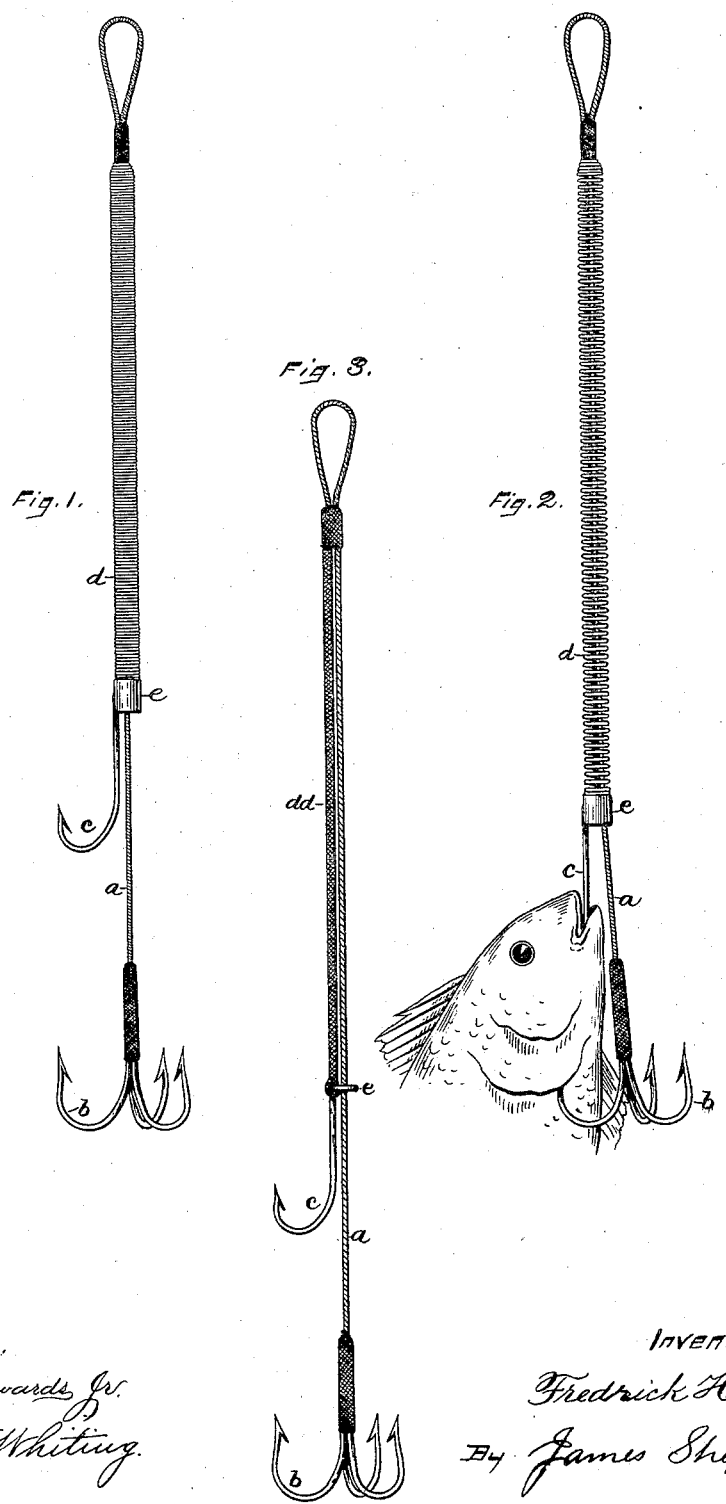

FREDRICK HUBBARD, OF BERLIN, ASSIGNOR OF ONE-HALF TO F. L. HUNGERFORD, OF NEW BRITAIN, CONNECTICUT.

FISHING-SNOOD.

SPECIFICATION forming part of Letters Patent No. 408,347, dated August 6, 1889.

Application filed February 28, 1889. Serial No. 301,577. (No model.)

*To all whom it may concern:*

Be it known that I, FREDRICK HUBBARD, of Berlin, in the county of Hartford and State of Connecticut, have invented certain new and useful Improvements in Fishing Hooks and Lines, of which the following is a description, reference being had to the accompanying drawings, in which—

Figure 1 is a view of a cluster of fishing hooks and line embodying my improvement. Fig. 2 is a view of the device in operation, showing the manner in which, an upper hook being depressed, one or more of the lower hooks secure the fish; and Fig. 3 is a view corresponding with Fig. 1, but showing the spring in the form of an elastic cord.

My invention relates to the class of automatic fish-hooks; and its object is so to construct the hooks and line as to insure the hooking of the fish and to make the device self-setting after removing the fish.

In the accompanying drawings, the letter $a$ denotes a fish-line, to one end of which is securely attached one or more fish-hooks $b$ of ordinary construction.

The letter $c$ denotes the upper or bait hook, which is attached to the lower end of a coiled spring $d$, the upper end of which spring is attached to the line, (running through it,) and at such a distance above the lower hook or hooks $b$ that the bait-hook shall normally hang a little distance above the said bait hook or hooks $b$. The spring $d$ may be provided with a collar or guide $e$, to which one or more bait-hooks may be secured, if desired.

In Fig. 3 the elastic cord $d$ $d$ is the spring, and is substituted for the spiral spring $d$ of the other figures, while the collar or guide $e$ serves to keep the bait-hook $c$ close to the line when the hooks approach each other.

In practice the lower hook or hooks $b$ and the spring $d$, with its hook or hooks $c$, are fastened to a short piece of line or snell provided with a loop for attachment to the main line. The hooks $b$ are left bare. The hook $c$ is baited. The spring is of such elasticity that a pull upward on the line by the fisherman or a pull downward on the hook $c$ by a fish will cause the spring to stretch and draw the upper and lower hooks toward each other, thereby forcing the lower hooks into the fish and preventing its escape even if the upper or bait hook does not catch into the fish.

The device is exceedingly simple and so sensitive as to respond to the slightest nibble, thus saving bait and increasing the chances of entrapping the fish. It is neither cumbersome nor unsightly, operates noiselessly, and will not frighten the fish. It is also preferable to a slip attachment for the upper hook $c$, because it needs no adjustment, but once adjusted it is always adjusted; or, in other words, it is self-setting.

I am aware that prior patents show a rigid bar with a pivoted hook at one end, a second hook secured to a slide on said bar and adapted to be fastened by a latch on the upper end of said pivoted hook, and a spring to draw the slide and its hook toward the pivoted hook when the latch is released, and the same is hereby disclaimed.

I claim as my invention—

1. The combination of the line $a$, hook or hooks $b$, attached thereto, a spring attached by one end to said line, and a hook or hooks attached to the other end of said spring the length of said spring, and the point of its attachment being such that when the spring is contracted the hook or hooks attached thereto are separated from the hook or hooks attached directly to the line, substantially as described, and for the purpose specified.

2. The combination of a fishing-line, a hook or hooks at its end, a spring attached by one end to said line, the fish-hook $c$ at the other end of said spring, the length of said spring and the point of its attachment being such that when the spring is contracted the hook or hooks attached thereto are separated from the hook or hooks attached directly to the line, and a sliding collar or guide for keeping the hook on the end of the spring close to the line, substantially as described, and for the purpose specified.

FREDRICK HUBBARD.

Witnesses:
GEORGE SCOTT,
A. A. BARNES.